United States Patent Office 3,752,708
Patented Aug. 14, 1973

3,752,708
CORROSION RESISTANT COMPOSITION AND METHOD
Isaac Laird Newell, Weathersfield, Conn., and William F. Houlihan, Springfield, Mass., assignors to Heatbath Corporation, Springfield, Mass.
No Drawing. Filed Aug. 23, 1971, Ser. No. 174,151
Int. Cl. C23f 7/26
U.S. Cl. 148—6.2  23 Claims

ABSTRACT OF THE DISCLOSURE

Corrosion resistant compositions are disclosed which comprise an aqueous solution of a water-soluble hexavalent chromium compound, a water-soluble inorganic fluorine-containing compound, a soluble rate earth metal and a water-soluble manganese salt. The method of imparting a protective film to a metal surface using these compositions is also described.

BACKGROUND OF THE INVENTION

In the metal finishing industry, there is a continuing need for coatings used for paint bonding and corrosion resistance. This is especially true in the aluminum industry where aluminum and aluminum containing alloys require such coatings for normal protection.

Many such coatings have been suggested and used in the past, such as the phosphate, zincate and anodized films, but these have had drawbacks due to the long time required to produce the films, the complex and often difficult operating procedures, and the high cost of the completed films.

Chromate films have been found useful for corrosion protection and paint bonding of aluminum and many methods for producing these films have been developed. Newell et al., U.S. Pat. No. 2,844,496, covers a chromate film forming composition on aluminum containing sulfamic acid and Newell et al., U.S. Pat. No. 3,520,736 covers a chromate film forming composition containing nitroprusside. These patented compositions were developed not only to produce the desired corrosion resistance and paint adherence, but to also reduce the time required and cost of operation and thus make the film more economical.

However, even more improvement was desired, especially in the rate of film formation, ease of operation, and cost. This invention covers a new method of accelerating the formation of a paint bonding and corrosion resistant film on aluminum and aluminum containing alloys which eliminates many of the disadvantages of previous methods.

It is the object of this invention to provide a method which, in less than 60 seconds, produces a satisfactory corrosion resistant and paint bond coating on aluminum and aluminum alloys by spraying or roller coating. Rapid production of coatings is also possible by brushing or dipping procedures and such are within the purview of this invention.

It is also an object of this invention to produce the required coating by means of stable aqueous solutions requiring a minimum of control. Another object is to produce coatings which exhibit an unusually high coating concentration expressed as mg./sq. ft. of surface.

Further objects of this invention include an economical method utilizing low cost materials producing a relatively inexpensive film; a non-complex solution having a wide pH range and variable composition making for ease of operation; and the production of a highly effective colored film wherein the depth of color is related to the weight.

SUMMARY OF THE INVENTION

Accordingly, this invention, in its broadest aspect, relates to compositions capable of rapidly producing a protective film on aluminum and aluminum-containing alloys which comprises an aqueous solution of a water-soluble chromium compound in which the chromium is in hexavalent form, a water-soluble inorganic fluorine-containing compound, a soluble rare earth metal salt and a water-soluble manganese salt.

In a copending application filed on the same day as this application entitled "Corrosion Resistant Composition and Method," having the same inventors and assignee, similar compositions are disclosed with the exception of the manganese salt.

Hence, even though both compositions are effective corrosion resistant compositions, the present invention improves upon the other by virtue of, including, a manganese salt. The presence of this material, in a manner not presently recognized, allows compositions of equivalent total concentration of active ingredients to impart a greater coating weight onto the treated surface. The coating weight is expressed as mg./sq. ft. of surface.

One embodiment of the above described compositions concerns the amount of each component. The following amounts of each on a grams per liter basis of total aqueous solution is preferred:

(a) Water-soluble chromium compound _____ 0.5 to 10.0 g./l.
(b) Water-soluble inorganic fluorine containing compound _____ 0.1 to 13.0 g./l.
(c) Rare earth metal salt _____ 50 mgs. to 5.0 g./l.
(d) Manganese salt _____ 50 mgs. to 6.0 g./l.

In the amounts just shown, the ensuing compositions are highly preferred embodiments of this invention:

| A | B | C | D | E | F |
|---|---|---|---|---|---|
| $CrO_3$ | $CrO_3$ | $CrO_3$ | $CrO_3$ | $CrO_3$ | $CrO_3$ |
| HF | HF | HF | HF | HF | $HBF_4$ |
| $Ce(NO_3)_3$ | $Th(NO_3)_4$ | $Sm(NO_3)_3$ | $Pr(NO_3)_3$ | $Nd(NO_3)_3$ | $Ce(NO_3)_3$ |
| $Mn(NO_3)_2$ | $Mn(NO_3)_2$ | $Mn(NO_3)_2$ | $Mn(NO_3)_3$ | $Mn(NO_3)_3$ | $Mn(NO_3)_3$ |

Another highly desirable aspect of this invention deals with the inclusion of a water-soluble nitrate such as nitric acid, sodium, potassium and/or ferric nitrate in the novel aqueous compositions disclosed herein.

Another aspect of this invention relates to the method of imparting a visible protective film to a metal surface, preferably an aluminum or aluminum-containing alloy, by contacting said surface with the compositions described herein.

DETAILED DESCRIPTION OF THE INVENTION

The compositions of this invention are employed in aqueous medium and are substantially compatible with treating equipment and methods already in use. In essence, the compositions of this invention comprise (a) a chromium compound, (b) a fluorine-containing compound, (c) a soluble rare earth metal salt and (d) a water-soluble manganese salt.

The rare earth metal salt and manganese salt components are the constituents that appear to be primarily responsible for the superior effects obtained by means of this invention. Compositions containing chromium compounds or compositions containing chromium compounds plus fluorine-containing compounds have been known for many years. Ferricyanide-fluoride compounds have been tried, with and without chromium compounds, but this combination leads to varying colorations and coating thicknesses with relatively small changes, sometimes inadvertent, in ingredient concentrations. The incorporation of rare earth metal salts and manganese salts accelerate the film formation to such an extent that a visible coating is produced usually within seconds. Moreover, the action of these accelerators is so great that only minor amounts are necessary. Still further, they provide an unexpectedly heavy surface coating within a short period of time and at low concentrations.

The rare earth metal salts used herein should be soluble in the chromate bath. Generally, solubility will be at least about one gram per liter of water.

Representative of rare earth metals are cerium, ytterbium, praseodymium, neodymium, promethium (sometimes known as illinium), samarium, europium, gadolinium, terbium, dysprosium, holmium, erbium, thulium, lutetium and also closely related element thorium.

The rare earth metal salts employed can either be the salt of a single rare earth metal or mixtures of rare earth metals, such as rare earth chlorides or didymium chlorides. Rare earth chloride solutions are commercially available.

The anionic portion of the rare earth metal salt is not critical so long as the resulting compound is water soluble. Hence, the anionic portion can be of the inorganic type such as chloride, fluoride, nitrate, etc. or of the organic type such as acetate, propionate, etc.

The amount of rare earth metal salt added to the herein disclosed aqueous compositions can range from 50 mgs. to 5.0 grams per liter and, more preferred, is a range from 50 mgs. to 3 g./l.

The manganese salt employed should be water-soluble. Generally, solubility will be at least about 25 grams per liter of water.

The anionic portion of the manganese salt is not critical so long as the resulting compound is water-soluble. Hence, the anionic portion can be of the inorganic type such as chloride, fluoride, nitrate, etc., or of the organic type such as acetate, propionate, etc.

The amount of manganese salt added to the herein disclosed aqueous composition can range from 50 mgs. to 6.0 grams per liter and more preferred, is a range from 50 mgs. to 3.0 g./l.

The chromium compound should be water soluble in the amount employed in the composition. Preferably, the water solubility of the chromium compound should be at least about 50 grams per liter. The chromium in the chromium compound should be in the hexavalent state. Chromium trioxide ($CrO_3$) is a useful and preferred chromium compound. Chromium trioxide is also referred to in the art as either chromic acid or chromic anhydride, there being some question as to whether in aqueous solution the initial chromium trioxide reacts with water to form the compound that might be referred to as hydrogen chromate or chromic acid, or whether chromium trioxide exists in solution as such. As used in this application and in the claims appended hereto, the term "chromium trioxide" is intended to refer both to solid chromium trioxide and to the compound formed when chromium trioxide is dissolved in water. Other water soluble sources of hexavalent chromium can be employed instead. For example, alkali metal chromates such as sodium chromate and potassium chromate can be employed. Other chromates meeting the solubility requirements can also be employed. Where desired, dichromates such as alkali metal dichromates can be used as the chromium compound or as an auxiliary chromium compound in admixture with chromium trioxide or a water soluble chromate.

The chromium compound is added in an amount to provide from 0.5 to 10 grams per liter of the aqueous solutions disclosed herein. Even more preferred is the range from 0.75 to 2.0 g./l.

The fourth component of the compositions of this invention is an inorganic fluorine-containing compound. The precise identity of the inorganic fluorine-containing compound is not critical; although it must be at least sparingly soluble in water and at least partially ionizable. Compounds used in this invention to supply a source of fluorine should be soluble at least to the extent of about 0.1 gram per liter of water. Representative fluorine-containing compounds, capable of use in this invention, include hydrogen fluoride, salts of hydrogen fluoride such as the alkali metal salts, e.g. sodium fluoride and potassium fluoride, the fluosilicates (otherwise known as silico-fluorides), such as sodium fluosilicate and potassium fluosilicate. Fluosilicic acid can also be employed if desired; although it is difficult to handle. Other fluorine compounds useful in the invention include bifluorides, for example, sodium bifluoride, $NaHF_2$, fluoboric acid and the various salts of fluoboric acid, e.g. sodium fluoborate and potassium fluoborate, fluotitanates, fluozirconates and other complex fluorides.

In the aqueous coating solution, the inorganic fluorine-containing compounds should be present in sufficient amount to provide from 0.1 to 13.0 grams per liter of aqueous solution. Even more preferred is the range from 0.5 to 7.5 g./l.

Other additives can be employed in the practice of this invention to enhance the effectiveness of the inventive compositions. For example, improved results appear to be obtained when there is an inorganic nitrate present in the solution. The inorganic nitrate can be nitric acid itself or a water soluble nitrate whose cationic portion does not have an adverse effect on the other constituents of the compositions and processes. Representative inorganic nitrates include sodium, nitrate, potassium nitrate and ferric nitrate. The quantity of nitrate component can vary from 0 to about 10 grams per liter calculated on the weight of the nitrate radical. In some instances, the use of nitrate such as ferric nitrate is desirable for added coloration.

The pH of the aqueous solution is from about 0.7 to 2.5, preferably in the range from 1 to 1.5. Adjustment of pH can be made where necessary with suitable acids such as nitric acid. The use of reducing acids, such as sulfurous acid is best avoided since it appears to have a deleterious effect.

Where alkaline adjustment is required, a suitable alkali metal hydroxide or carbonate such as sodium hydroxide or potassium hydroxide can be employed.

A convenient method of marketing the compositions of this invention is to package the source of chromium, the source of fluorine, the rare earth metal salt compound and manganese salt all together in solid form in substantially anhydrous conditions with the ultimate user adding the water. Alternatively, the components can be marketed as an aqueous concentrate of chromium trioxide, rare earth metal salt and manganese salt with the user adding the more sparingly soluble fluorine-containing compound and additional water to make up the requisite concentration.

In use, the compositions of this invention are particularly adapted for application to an aluminum or aluminum alloy (at least 80% aluminum) surface. Good results are also achieved upon application to other metals with which the compositions are compatible using standard handling and process techniques. Representative other metals include zinc, magnesium and cadmium. All that is necessary is to insure adequate contact between the aqueous composition and the metal surface being protected. A contact time from 5 seconds upward can be employed, dependent upon the thickness of coating desired. Contact times of 10 seconds yield coatings having commercially desirable properties in all respects. Longer contact times can be employed to build up thicker coatings where subsequent finishing operations require, for one reason or another, a thicker coating. The compositions of the invention can be applied by spraying, brushing, immersing, dipping, roller coating, painting or any other suitable means. The temperature of application can preferably be within the range from about 60° F. to 150° F.

Example 1

A one (1) liter aqueous solution was prepared containing the following amounts of ingredients:

| Component: | Grams per liter |
|---|---|
| Chromic acid | 1.08 |
| Hydrofluoric acid (50%) | 0.65 |
| Cerium nitrate hexahydrate | 0.26 |
| Manganese nitrate (50%) | 0.65 |

The bath (pH 1.90) was heated to a temperature of 100° F. and a sheet of aluminum alloy (6061) was sprayed for a period of 60 seconds at a nozzle pressure of 18 p.s.i. A visible, light gold colored coating was obtained with excellent adherence, abrasion resistance and uniformity. The coating weight was found to be 50.3 mg./sq. ft.

Example II

A similar 1 liter solution was prepared containing the following:

| Component: | Grams per liter |
|---|---|
| Chromic acid | 1.77 |
| Hydrofluoric acid (50%) | 1.63 |
| Thorium nitrate quadrahydrate | 0.26 |
| Manganese nitrate | 1.35 |

This bath having a pH of 1.80 was heated to 100° F. and an aluminum panel sprayed for 10 seconds at 18 p.s.i. nozzle pressure. The resulting coating was visible, light gold colored, adherent and abrasive resistant and provided a uniform weight of 19.9 mg./sq. ft.

Examples III–LIV

The following additional 1 liter aqueous solutions within the purview of this invention were found to yield satisfactory corrosion protection to aluminum samples. Quantities of solutes are expressed in g./l.

|  | III | IV | V |
|---|---|---|---|
| Chromic acid | 1.58 | 1.58 | 1.77 |
| Sodium dichromate | | | |
| Hydrofluoric acid (50%) | 1.21 | 1.21 | 1.63 |
| Fluoboric acid (48%) | | | |
| Hydrofluosilicic acid (30%) | | | |
| Ammonium hexafluorotitanate | | | |
| Manganese nitrate (50%) | 1.03 | 0.66 | 1.35 |
| Cerium nitrate | 0.26 | 0.26 | |
| Thorium nitrate | | | 0.13 |
| Samarium nitrate | | | |
| Praseodymium nitrate | | | |
| Neodymium nitrate | | | |
| Misch metal carbonate | | | |
| Nitric acid | | | |
| pH | 1.80 | 1.80 | 1.80 |
| Temperature, °F | 100 | 100 | 100 |
| Time of spray, seconds | 10 | 10 | 10 |
| Pressure, p.s.i. | 18 | 18 | 18 |
| Coating weight, mg./kg | 20 | 16.5 | 18.6 |
| Color | (¹) | (¹) | |

|  | VI | VII | VIII | IX |
|---|---|---|---|---|
| Chromic acid | 1.77 | 4.65 | 1.54 | 3.15 |
| Sodium dichromate | | | | |
| Hydrofluoric acid (50%) | 1.63 | 1.48 | 0.73 | 0.95 |
| Fluoboric acid (48%) | | | | |
| Hydrofluosilicic acid (30%) | | | | |
| Ammonium hexafluorotitanate | | | | |
| Manganese nitrate (50%) | 1.35 | 2.17 | 2.18 | 1.44 |
| Cerium nitrate | | | | |
| Thorium nitrate | 0.07 | 0.52 | 0.26 | 0.79 |
| Samarium nitrate | | | | |
| Praseodymium nitrate | | | | |
| Neodymium nitrate | | | | |
| Misch metal carbonate | | | | |
| Nitric acid | | | | 3.75 |
| pH | 1.85 | 1.55 | 2.05 | 1.4 |
| Temperature, °F | 100 | 100 | 100 | 100 |
| Time of spray, seconds | 20 | 10 | 10 | 10 |
| Pressure, p.s.i. | 18 | 18 | 18 | 18 |
| Coating weight, mg./kg | | 25.5 | 29.5 | 20.7 |
| Color | (²) | (³) | (³) | (²) |

|  | X | XI | XII | XIII |
|---|---|---|---|---|
| Chromic acid | 0.79 | 1.58 | 1.58 | 1.58 |
| Sodium dichromate | | | | |
| Hydrofluoric acid (50%) | 0.24 | | | |
| Fluoboric acid (48%) | | 0.66 | 3.30 | 5.90 |
| Hydrofluosilicic acid (30%) | | | | |
| Ammonium hexafluorotitanate | | | | |
| Manganese nitrate (50%) | 0.36 | 0.5 | 0.72 | 0.72 |
| Cerium nitrate | | 0.39 | 0.39 | 0.39 |
| Thorium nitrate | 0.20 | | | |
| Samarium nitrate | | | | |
| Praseodymium nitrate | | | | |
| Neodymium nitrate | | | | |
| Misch metal carbonate | | | | |
| Nitric acid | 0.94 | | | |
| pH | 1.5 | 1.55 | 1.50 | 1.40 |
| Temperature, °F | 100 | 80 | 110 | 110 |
| Time of spray, seconds | 10 | 60 | 10 | 60 |
| Pressure, p.s.i. | 18 | 18 | 18 | 18 |
| Coating weight, mg./kg | 23.9 | | 10.0 | 36.5 |
| Color | (²) | | (²) | (³) |

|  | XIV | XV | XVI | XVII |
|---|---|---|---|---|
| Chromic acid | | 1.58 | 1.58 | 1.58 |
| Sodium dichromate | 2.95 | | | |
| Hydrofluoric acid (50%) | | | | |
| Fluoboric acid (48%) | 7.9 | 4.0 | 5.26 | 5.26 |
| Hydrofluosilicic acid (30%) | | | | |
| Ammonium hexafluorotitanate | | | | |
| Manganese nitrate (50%) | 0.72 | 2.0 | 2.0 | 2.0 |
| Cerium nitrate | 0.66 | 1.0 | 2.0 | 3.0 |
| Thorium nitrate | | | | |
| Samarium nitrate | | | | |
| Praseodymium nitrate | | | | |
| Neodymium nitrate | | | | |
| Mishch metal carbonate | | | | |
| Nitric acid | 2.8 | | | |
| pH | 1.1 | 1.5 | 1.35 | 1.25 |
| Temperature, °F | 100 | 100 | 100 | 100 |
| Time of spray, seconds | 60 | 60 | 60 | 60 |
| Pressure, p.s.i. | 18 | 18 | 18 | 18 |
| Coating weight, mg./kg | | | | |
| Color | (²) | (⁴) | (⁵) | (²) |

|  | XVIII | XIX | XX | XXI |
|---|---|---|---|---|
| Chromic acid | 1.58 | 1.58 | 1.58 | 1.58 |
| Sodium dichromate | | | | |
| Hydrofluoric acid (50%) | | | | |
| Fluoboric acid (48%) | 5.26 | 6.63 | 8.0 | 9.2 |
| Hydrofluosilicic acid (30%) | | | | |
| Ammonium hexafluorotitanate | | | | |
| Manganese nitrate (50%) | 2.0 | 2.0 | 2.0 | 2.0 |
| Cerium nitrate | 5.0 | 5.0 | 5.0 | 5.0 |
| Thorium nitrate | | | | |
| Samarium nitrate | | | | |
| Praseodymium nitrate | | | | |
| Neodymium nitrate | | | | |
| Misch metal carbonate | | | | |
| Nitric acid | | | | |
| pH | 1.25 | 1.20 | 1.15 | 1.13 |
| Temperature, °F | 100 | 100 | 100 | 100 |
| Time of spray, seconds | 60 | 60 | 60 | 60 |
| Pressure, p.s.i. | 18 | 18 | 18 | 18 |
| Coating weight, mg./kg | | | | |
| Color | (²) | (²) | (⁶) | (⁷) |

See footnotes at end of table.

|  | XXII | XXIII | XXIV | XXV |
|---|---|---|---|---|
| Chromic acid | 1.58 | 1.58 | 1.58 | 1.58 |
| Sodium dichromate | | | | |
| Hydrofluoric acid (50%) | | | | |
| Fluoboric acid (48%) | 10.53 | 5.26 | 8.0 | 5.26 |
| Hydrofluosilicic acid (30%) | | | | |
| Ammonium hexafluorotitanate | | | | |
| Manganese nitrate (50%) | 2.0 | 4.0 | 1.71 | 1.71 |
| Cerium nitrate | 5.0 | 2.0 | | 0.65 |
| Thorium nitrate | | | | |
| Samarium nitrate | | | | |
| Praseodymium nitrate | | | | |
| Neodymium nitrate | | | | |
| Misch metal carbonate | | | 0.80 | |
| Nitric acid | | | | |
| pH | 1.10 | 1.38 | 1.15 | 1.7 |
| Temperature, °F | 100 | 100 | 100 | 100 |
| Time of spray, seconds | 60 | 60 | 60 | 60 |
| Pressure, p.s.i | 18 | 18 | 18 | 18 |
| Coating weight, mg./kg | | | 46.3 | |
| Color | [8] | [9] | [10] | [11] |

|  | XXVI | XXVII | XXVIII | XXIX |
|---|---|---|---|---|
| Chromic acid | 1.58 | 1.58 | 1.58 | 10 |
| Sodium dichromate | | | | |
| Hydrofluoric acid (50%) | | | | 2.4 |
| Fluoboric acid (48%) | 10.52 | 2.66 | 7.98 | |
| Hydrofluosilicic acid (30%) | | | | |
| Ammonium hexafluorotitanate | | | | |
| Manganese nitrate (50%) | 1.71 | 1.71 | 1.71 | 1.1 |
| Cerium nitrate | 0.65 | 0.79 | 0.79 | |
| Thorium nitrate | | | | |
| Samarium nitrate | | | | 2.0 |
| Praseodymium nitrate | | | | |
| Neodymium nitrate | | | | |
| Misch metal carbonate | | | | |
| Nitric acid | | | | 2.84 |
| pH | 1.2 | | | 1.20 |
| Temperature, °F | 100 | 100 | 100 | 70 |
| Time of spray, minutes | 1 | 1 | 1 | [12] 7 |
| Pressure, p.s.i | 18 | 18 | 18 | |
| Coating weight, mg./kg | | | | 10.0 |
| Color | [11] | | | Gray |

|  | XXX | XXXI | XXXII | XXXIII |
|---|---|---|---|---|
| Chromic acid | 5 | 5 | 1.58 | 1.58 |
| Sodium dichromate | | | | |
| Hydrofluoric acid (50%) | 4.8 | 4.8 | | |
| Fluoboric acid (48%) | | | | |
| Hydrofluosilicic acid (30%) | | | 2.63 | 5.26 |
| Ammonium hexafluorotitanate | | | | |
| Manganese nitrate (50%) | 1.1 | 1.1 | 0.86 | 0.86 |
| Cerium nitrate | | | 0.38 | 0.38 |
| Thorium nitrate | | | | |
| Samarium nitrate | | | | |
| Praseodymium nitrate | 4.0 | | | |
| Neodymium nitrate | | 2.0 | | |
| Misch metal carbonate | | | | |
| Nitric acid | 2.84 | 5.68 | | |
| pH | 1.25 | 1.20 | 1.55 | 1.5 |
| Temperature, °F | 100 | 80 | 100 | 100 |
| Time of spray, minutes | [13] 7 | [13] 7 | 1 | 1 |
| Pressure, p.s.i | | | 18 | 18 |
| Coating weight, mg./kg | 38.8 | 55.4 | | |
| Color | [3] | Brown | [14] | [15] |

|  | XXXIV | XXXV | XXXVI | XXXVII |
|---|---|---|---|---|
| Chromic acid | 2.37 | 1.58 | 6.32 | 7.90 |
| Sodium dichromate | | | | |
| Hydrofluoric acid (50%) | | | | |
| Fluoboric acid (48%) | | | | |
| Hydrofluosilicic acid (30%) | 5.26 | 1.32 | | |
| Ammonium hexafluorotitanate | | | 1.32 | 1.32 |
| Manganese nitrate (50%) | 0.86 | 0.86 | 1.71 | 1.71 |
| Cerium nitrate | 0.38 | 0.38 | 0.66 | 0.66 |
| Thorium nitrate | | | | |
| Samarium nitrate | | | | |
| Praseodymium nitrate | | | | |
| Neodymium nitrate | | | | |
| Misch metal carbonate | | | 0.89 | |
| Nitric acid | | | | |
| pH | 1.5 | 1.7 | 1.25 | 1.25 |
| Temperature, °F | 100 | 100 | 100 | 100 |
| Time of spray, seconds | 60 | 60 | 60 | 60 |
| Pressure, p.s.i | 18 | 18 | 18 | 18 |
| Coating weight, mg./kg | | | | |
| Color | [16] | | [17] | Brown |

|  | XXXVIII | XXXIX | XL |
|---|---|---|---|
| Chromic acid | | | |
| Sodium dichromate | 4.0 | 4.0 | 4.0 |
| Hydrofluoric acid (50%) | | | |
| Fluoboric acid (48%) | 5.30 | 7.88 | 10.6 |
| Hydrofluosilicic acid (30%) | | | |
| Ammonium hexafluorotitanate | | | |
| Manganese nitrate (50%) | 1.71 | 1.71 | 1.71 |
| Cerium nitrate | 1.32 | 1.32 | 1.32 |
| Thorium nitrate | | | |
| Samarium nitrate | | | |
| Praseodymium nitrate | | | |
| Neodymium nitrate | | | |
| Misch metal carbonate | | | |
| Nitric acid | | | |
| pH | 1.45 | 1.25 | 1.10 |
| Temperature, °F | 100 | 100 | 100 |
| Time of spray, seconds | 60 | 60 | 60 |
| Pressure, p.s.i | 18 | 18 | 18 |
| Coating weight, mg./kg | | | |
| Color | [18] | [19] | [10] |

|  | XLI | XLII | XLIII | XLIV |
|---|---|---|---|---|
| Chromic acid | | | 1.58 | 1.58 |
| Sodium dichromate | 4.0 | 4.0 | | |
| Hydrofluoric acid (50%) | | | | |
| Fluoboric acid (48%) | 11.97 | 13.15 | 4.34 | 4.34 |
| Hydrofluosilicic acid (30%) | | | | |
| Ammonium hexafluorotitanate | | | | |
| Manganese nitrate (50%) | 1.71 | 1.71 | 1.71 | 1.71 |
| Cerium nitrate | 1.31 | 1.31 | | |
| Thorium nitrate | | | | |
| Samarium nitrate | | | | |
| Praseodymium nitrate | | | | |
| Neodymium nitrate | | | 1.31 | 2.62 |
| Misch metal carbonate | | | 1.31 | 1.31 |
| Nitric acid | | | | |
| pH | 1.10 | 1.10 | 1.35 | 1.6 |
| Temperature, °F | 100 | 100 | 100 | 100 |
| Time of spray, seconds | 60 | 60 | 60 | 60 |
| Pressure, p.s.i | 18 | 18 | 18 | 18 |
| Coating weight, mg./kg | | | | |
| Color | [15] | [20] | [5] | [5] |

|  | XLV | XLVI | XLVII | XLVIII |
|---|---|---|---|---|
| Chromic acid | 3.16 | 1.58 | 1.58 | 1.58 |
| Sodium dichromate | | | | |
| Hydrofluoric acid (50%) | | | | |
| Fluoboric acid (48%) | 8.0 | 5.26 | 5.26 | 5.26 |
| Hydrofluosilicic acid (30%) | | | | |
| Ammonium hexafluorotitanate | | | | |
| Manganese nitrate (50%) | 1.31 | 6.0 | 8.0 | 10.0 |
| Cerium nitrate | | 2.0 | 2.0 | 2.0 |
| Thorium nitrate | | | | |
| Samarium nitrate | | | | |
| Praseodymium nitrate | | | | |
| Neodymium nitrate | | | | |
| Misch metal carbonate | 1.31 | | | |
| Nitric acid | 5.26 | | | |
| pH | 1.1 | 1.45 | 1.45 | 1.45 |
| Temperature, °F | 100 | 100 | 100 | 100 |
| Time of spray, seconds | 60 | 60 | 60 | 60 |
| Pressure, p.s.i | 18 | 18 | 18 | 18 |
| Coating weight, mg./kg | | | | |
| Color | [2] | [21] | [22] | [22] |

|  | XLVI | L | LI | LII |
|---|---|---|---|---|
| Chromic acid | 1.58 | 1.58 | 1.58 | 3.16 |
| Sodium dichromate | | | | |
| Hydrofluoric acid (50%) | | | | |
| Fluoboric acid (48%) | 5.26 | 8.0 | 4.0 | 4.0 |
| Hydrofluosilicic acid (30%) | | | | |
| Ammonium hexafluorotitanate | | | | |
| Manganese nitrate (50%) | 12.0 | 12.0 | 3.0 | 3.0 |
| Cerium nitrate | 2.0 | 2.0 | 2.0 | 2.0 |
| Thorium nitrate | | | | |
| Samarium nitrate | | | | |
| Praseodymium nitrate | | | | |
| Neodymium nitrate | | | | |
| Misch metal carbonate | | | | |
| Nitric acid | | | | |
| pH | 1.45 | 1.2 | 1.50 | 1.25 |
| Temperature, °F | 100 | 100 | 100 | 100 |
| Time of spray, seconds | 60 | 60 | 60 | 60 |
| Pressure, p.s.i | 18 | 18 | 18 | 18 |
| Coating weight, mg./kg | | | | |
| Color | [23] | [22] | [24] | [2] |

See footnotes at end of table.

|  | LIII | LIV |
|---|---|---|
| Chromic acid | 3.95 | 4.74 |
| Sodium dichromate | | |
| Hydrofluoric acid (50%) | | |
| Fluoboric acid (48%) | 4.0 | 5.26 |
| Hydrofluosilicic acid (30%) | | |
| Ammonium hexafluorotitanate | | |
| Manganese nitrate (50%) | 3.0 | 3.0 |
| Cerium nitrate | 2.0 | 2.0 |
| Thorium nitrate | | |
| Samarium nitrate | | |
| Praseodymium nitrate | | |
| Neodymium nitrate | | |
| Misch metal carbonate | | |
| Nitric acid | | |
| pH | 1.05 | 0.95 |
| Temperature, °F | 100 | 100 |
| Time of spray, seconds | 60 | 60 |
| Pressure, p.s.i | 18 | 18 |
| Coating weight, mg./kg | | |
| Color | Yellow | (²) |

¹ Light gold.
² Light yellow.
³ Yellow.
⁴ Irrid. yellow.
⁵ Bright yellow.
⁶ Medium dark yellow.
⁷ Heavy yellow.
⁸ Irrid. dark yellow.
⁹ Moderate dark yellow.
¹⁰ Dark yellow.
¹¹ Colorless.
¹² The panel of Example XXIX was dipped for seven minutes in the bath to prepare the coated panel.
¹³ The panel of Example XXX and XXXI was dipped for seven minutes in the bath to prepare the coated panel.
¹⁴ Dull yellow.
¹⁵ Dull dark yellow.
¹⁶ Dull light yellow.
¹⁷ Light tan.
¹⁸ Very light yellow.
¹⁹ Greenish yellow.
²⁰ Dull etched yellow.
²¹ Dark irrid. pink.
²² Dark dull yellow.
²³ Very dark yellow.
²⁴ Light pink.

Examples LV–LVIX

The following aqueous compositions (1 l.) were prepared and coated on the aluminum alloys indicated: The coating tests were run at 100° F., 18 p.s.i. spray pressure and 60 seconds spray time. Quantities of solutes are expressed in grams/liter.

|  | LV | LVI | LVII | LVIII | LVIX |
|---|---|---|---|---|---|
| Chromic acid | 1.58 | 1.58 | 1.58 | 1.58 | 1.50 |
| Cerium nitrate | 0.53 | 0.53 | 0.53 | 0.53 | 0.53 |
| Nitric acid | 1.18 | 1.18 | 0.66 | 0.66 | 0.66 |
| Manganese nitrate (50%) | 1.45 | 1.98 | 0.73 | 1.46 | 2.19 |
| Fluoboric acid (48%) | 3.3 | 3.3 | | | |
| Hydrofluoric acid (50%) | | | 1.32 | 1.32 | 1.32 |
| Color: | | | | | |
| Alloy 3003 | Dull light yellow | Dull light yellow | Dull yellow | Very slightly darker yellow. | Very slightly darker yellow. |
| Alloy 2024 | Darker yellow more irrid. | Darker yellow | Slightly darker yellow | Slightly darker yellow | Even more darker yellow. |
| Alloy 6061 | Very faint light yellow | Very faint light yellow. | No change | No change | No change. |
| Alloy 7075 | Darker yellow more irrid. | Darker yellow | Very slightly darker yellow. | Very slightly darker yellow. | Slightly darker yellow. |

The chemical compositions of the aluminum alloys used in Examples LV to LIX are given herewith.

| Alloy | Si | Fe | Cu | Mn | Mo | Cr | Zn | Ti | Others |
|---|---|---|---|---|---|---|---|---|---|
| Composition 7075 | 0.5 | 0.7 | 1.2–2.0 | 0.3 | 2.1–2.9 | 0.18–0.4 | 5.1–6.1 | 0.2 | 0.15 |
| Composition 6061 | 0.4–0.8 | 0.7 | 0.15–0.4 | 0.15 | 0.8–1.2 | 0.15–0.35 | 0.25 | 0.15 | 0.15 |
| Composition 3003 | 0.6 | 0.7 | 0.2 | 1.0–1.5 | | | 0.1 | | 0.15 |
| Composition 2024 | 0.5 | 0.5 | 3.8–4.9 | 0.3–0.9 | 1.2–1.8 | 0.1 | 0.25 | 0.15 | 0.15 |

Examples LX–LXI

The following aqueous compositions (1 l.) were prepared and coated on aluminum panels: Quantities of solutes are expressed in grams/liter.

|  | LX | LXI |
|---|---|---|
| Chromic acid | 1.58 | 1.58 |
| Fluoboric acid (50%) | 5.26 | 5.26 |
| Cerium nitrate | .0019 | 1.00 |
| Manganese nitrate | .0021 | 1.00 |
| pH | 1.55 | 1.50 |
| Temperature, °F | 90 | 100 |
| Color: | | |
| 10 seconds | Pinkish | Light yellow³ |
| 60 seconds | Light yellow | Medium yellow. |

Example LXII

The following compositions were prepared and were used to coat aluminum panels:

|  | A | B | C | D |
|---|---|---|---|---|
| Chromic acid, g./l | 1.58 | 1.58 | 5.8 | 1.58 |
| Cerium nitrate, g./l | 2.00 | 2.00 | 2.00 | 0.26 |
| Hydrofluoric acid (50%), g./l | | | | 0.65 |
| Fluoboric acid (48%), g./l | 5.26 | 5.26 | 5.26 | |
| Manganese nitrate, g./l | 8.00 | 10.00 | 12.00 | 0.65 |
| Water to make, ml | 1,000.0 | 1,000.0 | 1,000.0 | 1,000.0 |

The panel were coated by spraying for 60 seconds at a pressure of 18 p.s.i. After drying the panel was tested for corrosion resistance in a salt fog test as described in MIL–STD–810D, dated June 15, 1967, Method 509, which is hereby incorporated by reference. The test utilizes a 5% aqueous sodium chloride solution which is atomized in a chamber in which the test panel is placed. In this test the specific gravity of the salt solution was 1.04, the temperature was 95° F., the pH was 6.9 and the fog collected (mls./hr.) was 0.8. The following results were obtained.

|  | Coating temp., °F. | Hours | Comment |
|---|---|---|---|
| A | 100 | 620 | One spot noted. |
| B | 100 | 1,508 | One spot ½₂″ in diameter noted. |
| C | 100 | 2,000 | No visible corrosion. |
| D | 110 | 1,484 | Two spots noted. |

A corrosion resistance of 336 hours in this test is sufficient to qualify as a corrosion resistant film in MIL–C–81706, dated June 30, 1970, which is hereby incorporated by reference.

|  | LXIII | LXIV |
|---|---|---|
| Chromic acid | 3.16 | 3.16 |
| Sodium dichromate | | |
| Hydrofluoric acid (50%) | | |
| Fluoboric acid (48%) | | 5.26 |
| Hydrofluosilicic acid (30%) | 8.0 | |
| Ammonium hexafluorotitanate | | |
| Manganese nitrate (50%) | 1.31 | 1.31 |
| Cerium nitrate | 1.31 | 1.31 |
| Thorium nitrate | | |
| Samarium nitrate | | |
| Praseodymium nitrate | | |
| Neodymium nitrate | | |
| Misch metal carbonate | | |
| Nitric acid | 5.26 | |
| Sodium nitrate | | 6.0 |

What is claimed is:

1. A composition for the production of a corrosion resistant protective film on a metal surface which comprises an aqueous solution of from 0.5 to 10.0 grams per liter of a water-soluble chromium compound in which the chromium is in hexavalent form, from 0.1 to 13.0 grams per liter of a water-soluble inorganic fluorine-containing compound, from 50 mgs. to 5.0 grams per liter of a soluble rate earth metal salt and from 50 mgs. to 6.0 grams of a water-soluble manganese salt.

2. A composition as claimed in claim 1 wherein said water-soluble chromium compound is selected from the group consisting of chromium trioxide, alkali metal chromates and alkali metal dichromates present in an amount to provide from 0.5 to 10.0 grams per liter of said aqueous solution.

3. A composition as claimed in claim 2 wherein said chromium compound is chromium trioxide.

4. A composition as claimed in claim 1 wherein said fluorine-containing compound is selected from the group consisting of hydrogen fluoride, alkali metal fluorides, fluosilicic acid and alkali metal salts thereof, fluotitanic acid and alkali metal salts thereof, fluozirconic acid and alkali metal salts thereof, fluoboric acid and alkali metal salts theref, alkali metal bifluorides and mixtures thereof.

5. A composition as claimed in claim 4 wherein said fluorine-containing compound is hydrofluoric acid.

6. A composition as claimed in claim 4 wherein said fluorine-containing compound is fluoboric acid.

7. A composition for the production of a corrosion resistant protective film on a metal surface which consists essentially of an aqueous solution of from 0.5 to 10.0 grams per liter of a water-soluble chromium compound in which the chromium is in hexavalent form, from 0.1 to 13.0 grams per liter of a water-soluble inorganic fluorine-containing compound, from 50 mgs. to 5.0 grams per liter of a soluble rare earth metal salt and from 50 mgs. to 6.0 grams of a water-soluble manganese salt.

8. A composition as claimed in claim 1 wherein said rare earth salt is thorium nitrate.

9. A composition as claimed in claim 1 wherein said rare earth salt is cerium nitrate.

10. A composition claimed in claim 1 wherein said rare earth salt is samarium nitrate.

11. A composition as claimed in claim 1 wherein said rare earth salt is praseodymium nitrate.

12. A composition as claimed in claim 1 wherein said rare earth salt is neodymium nitrate.

13. A composition as claimed in claim 1 wherein the anionic portion of said water-soluble manganese salt is derived from an inorganic or organic acid.

14. A composition as claimed in claim 13 wherein said salt is selected from the group consisting of manganese chloride, manganese nitrate and manganese acetate.

15. A composition as claimed in claim 1 also containing a water-soluble inorganic nitrate.

16. A composition as claimed in claim 15 wherein said inorganic nitrate is selected from the group consisting of sodium nitrate, potassium nitrate and ferric nitrate.

17. A method of imparting a visible protective film to a metal surface comprising contacting the metal surface with the composition of claim 1 for a period of time and at a temperature sufficient to cause the formation of a visible protective films.

18. A method as claimed in claim 17 wherein the metal surface is aluminum or an aluminum-containing alloy.

19. A method as claimed in claim 17 wherein said composition also contains a water-soluble inorganic nitrate.

20. A method as claimed in claim 17 wherein the metal surface is zinc.

21. A method as claimed in claim 17 wherein the metal surface is cadmium.

22. A method as claimed in claim 17 wherein the metal surface is magnesium.

23. A corrosion resistant metal article which comprises a metal coated with a corrosion resistant amount of the composition of claim 1.

References Cited

UNITED STATES PATENTS

| | | | |
|---|---|---|---|
| 2,512,493 | 6/1950 | Gide | 148—6.2 X |
| 2,605,217 | 7/1952 | Freud | 148—6.2 X |
| 2,698,266 | 12/1954 | Thirsk | 148—6.2 |
| 3,444,007 | 5/1969 | Maurer et al. | 148—6.2 X |
| 3,493,441 | 2/1970 | Raysch et al. | 148—6.21 |

RALPH S. KENDALL, Primary Examiner

U.S. Cl. X.R.

148—6.27, 31.5